United States Patent [19]
Boden et al.

[11] Patent Number: 5,893,681
[45] Date of Patent: Apr. 13, 1999

[54] FLEXIBLE PIPE HAVING A FLEXIBLE WRAP APPLIED THERETO AND METHOD FOR ATTACHING THE WRAP

[75] Inventors: Kurt Boden, Habichtswald; Stefan Burger, Baunatal, both of Germany

[73] Assignee: Senior Engineering Investments AG, Schaffhausen, Switzerland

[21] Appl. No.: 08/779,275

[22] Filed: Jan. 6, 1997

[51] Int. Cl.[6] .................................................. F16L 1/00
[52] U.S. Cl. ........................... 405/157; 138/144; 405/43; 405/45
[58] Field of Search ............................. 405/36, 43–49, 405/154, 157, 155, 156; 285/903; 138/144

[56] References Cited

U.S. PATENT DOCUMENTS

| | | | |
|---|---|---|---|
| 2,300,547 | 11/1942 | Guarnaschelli | 285/22 |
| 2,444,988 | 7/1948 | Guarnaschelli | 138/50 |
| 3,315,704 | 4/1967 | Shire | 138/121 |
| 3,492,030 | 1/1970 | Harrison et al. | 285/300 |
| 3,722,539 | 3/1973 | Schmidt, Jr. | 137/590 |
| 3,740,832 | 6/1973 | Toepper | 29/508 |
| 3,976,578 | 8/1976 | Beane | 285/903 X |
| 4,233,097 | 11/1980 | Stahl | 138/144 X |
| 4,643,229 | 2/1987 | Hickin | 138/109 |
| 4,729,583 | 3/1988 | Lalikos et al. | 285/903 X |
| 4,862,924 | 9/1989 | Kanao | 138/144 |
| 4,903,735 | 2/1990 | Delacour et al. | 138/144 X |
| 5,228,479 | 7/1993 | Thomas | 138/144 X |
| 5,263,747 | 11/1993 | Lefebvre et al. | 285/903 X |
| 5,660,419 | 8/1997 | Kim | 285/903 |

FOREIGN PATENT DOCUMENTS

| | | |
|---|---|---|
| PS 974 608 | 11/1953 | Germany. |
| OS 24 17 219 | 10/1975 | Germany. |
| OS 25 58 478 | 6/1977 | Germany. |
| PS 28 53 726 | 6/1980 | Germany. |
| OS 37 02 676 | 8/1988 | Germany. |
| OS 39 37 956 | 5/1991 | Germany. |
| PS 41 34 899 | 5/1993 | Germany. |
| GM 94 04 814 | 6/1994 | Germany. |
| PS 260 167 | 7/1949 | Switzerland. |

*Primary Examiner*—Dennis L. Taylor
*Attorney, Agent, or Firm*—Dick and Harris

[57] ABSTRACT

A flexible supply line to connect media transporting underground supply lines includes a metal corrugated bellows, a connection member at each end of the metal bellows and a flexible wrap wrapped along the metal bellows and the connection members. The invention also includes a method for attaching the wrap to the metal bellows.

10 Claims, 1 Drawing Sheet

5,893,681

FLEXIBLE PIPE HAVING A FLEXIBLE WRAP APPLIED THERETO AND METHOD FOR ATTACHING THE WRAP

BACKGROUND OF THE INVENTION

Applicant claims priority under 35 U.S.C. §119 based upon PCT Patent Application PC/DE95/008743 filed Jul. 6, 1995, and German Patent Application P44 23 921.1 filed Jul. 7, 1994.

1. Field of the Invention

The present invention relates in general to flexible piping, and, more specifically to a flexible pipe used to connect rigid media conducting underground supply pipes comprising a metal corrugated bellows (or pipe) with connecting elements provided on both ends and a flexible wrap (or jacketing) extending along the entire length of the corrugated bellows and at least a part of one or both of the connecting elements.

2. Background Art

In mining areas, the surface of the earth often includes sink holes, fissures and compressions of the ground. Consequently, pipes that are layed in the ground are, over time, often displaced, pulled and buckled. Damage to the supply through these pipes often results if no elements are provided that can compensate for these movements. A particular potential for danger is inherent in gas pipe lines, wherein damage to the pipes may result in the leaking of gas, and, in turn, ignition of such a gas-air mixture.

Generally, supply pipes that are under low pressure and/or those that have nominal widths up to about DN 150 are often constructed of plastic material. Older supply pipes that have existed for years as well as newer pipes greater than DN 150 and/or those capable of withstanding higher pressures are constructed of steel or other metals. The steel/metal pipes are usually provided with plastic corrosion protection.

Gland extenders are disclosed in German patents DE OS 39 39 956, DE 28 53 726 and DE OS 37 02 693 as comprising an inner and an outer pipe wherein the pipes can move axially relative to each other. An elastomeric gasket or gland packing prevents the outflow of the gas from the pipe. A fundamental disadvantage of such an extender having the gaskets arises when the extender has undergone one or more displacements. Under such conditions, the extender is capable of developing leaks, permitting gas to flow out into the atmosphere, resulting in a dangerous condition. Further, dangerous conditions may result from the outflow of gas which follows along the pipe and, under certain circumstances, enters into buildings which are fed by the pipes.

Another disadvantage of the extender with gaskets is that the absorption of lateral or angular movements is generally non existent, or minimal at best. Thus, if lateral forces are imposed, leaks may develop in the pipes.

Generally, the above described extender comprises two flanges with the gasket therebetween, wherein the flanges are pressed against each other in order to provide the necessary compression for the gasket. If the extender must be insulated for purposes of corrosion protection, any parts that deviate from a cylindrical shape are difficult to insulate. To provide the proper insulation, it is also a disadvantage that the entire extension of the element is positioned only at a point at which the inner pipe leads into the outer pipe. A covering has to be produced that absorbs the entire displacement/movement at the point of entry. In sum, a cost effective and overall adequate solution is virtually impossible with this type of construction.

Corrugated pipes, corrugated hoses and compensators—bellows—for the purpose of equilibrating movements in steel pipes are also known. They are generally comprised of a stainless steel which is substantially flexible. As such, they require no addition of gaskets. These corrosion protected corrugated pipes are preferably used with underground pipes up to DIN 100.

German Patent DE 25 58 478 specifies a corrugated hose with a pipe stub connected at both ends which bears a covering composed of a shrink wrap hose for corrosion protection. The metallic corrugated hose on the inside is well suited for longitudinal, traverse and angular movements. The shrink wrap hoses are constructed by pre-extending them to larger diameters, then polymerizing them by radiation. These hoses are then shrunk back to the original narrower diameter (previous to the extension) upon application of heat. A covering that is comprised of shrink wrap hose is, however, only extendible to a limited extent.

The axial extendibility of PE shrink hoses which are suitable for corrugation for laying underground pipes do not, when overlayed, achieve the extendibility of the underlying stainless steel corrugated hoses. German Patent DE 97 46 08 specifies a wrapped metal hose with a PVC jacket, however the problems relating to axial extension are unfortunately the same. German Patent DE OS 37 02 676 specifies a corrugated hose having a braiding and a shrink wrap hose/coating, however, due to the braiding, axial extension is not possible. Moreover, while it is also known to apply viscous bitumen to metal corrugated hoses to form a coating, the ability for the hose to extend is limited after the bitumen mass has cooled.

Until now, the binding of a stainless steel bellows was wrapped with an overlap from winding to winding. G94 04 814.2 specifies the possibility of achieving axial extension by means of an elongated covering which comprises a corrosion protective wrapping that is separated from the corrugated surface. However, when axial extendibility is the most important characteristic for compensators, and previous jacketings have not achieved the axial extendibility of metal bellows, a jacketing that features greater extendibility is necessary.

SUMMARY OF THE INVENTION

An essential step for increasing the axial extension has been achieved by the introduction of corrosion protection wrap on a corrugated body. In this case, a multilayered corrosion protection wrap, composed of rubber and PE, is wound onto a corrugated hose in an overlapping manner. While the rubber layers of the wrap fuse with each other, they are able to allow the windings of the corrosion protection wrap to slide on top of one another without impairing the sealing ability thereof. The windings permit the longitudinal extension of the element to a greater extent than the extension of the PE material in the corrosion protection layer.

Accordingly, an object of the present invention is to provide a pipe line compensator composed of stainless steel bellows for application with underground supply lines for gaseous and liquid media which achieves a high level of axial extension as a primary solution, permits lateral movement, provides corrosion protection for the bellows and the connection parts, and is cost effective to produce.

Indeed, it is a particular advantage that the invention unites the extendibility of the helically wound wrap with the extendibility of a casing in a bellows form.

DETAILED DESCRIPTION OF THE INVENTION

Figure 1:
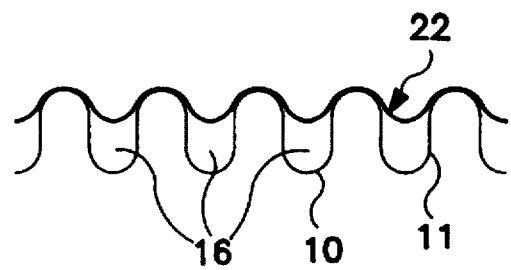
FIG. 1 is a partial cross-sectional view of the corrugated metal bellows with the wrap interjecting partially into the intermediate spaces of the corrugations.
Figure 2:
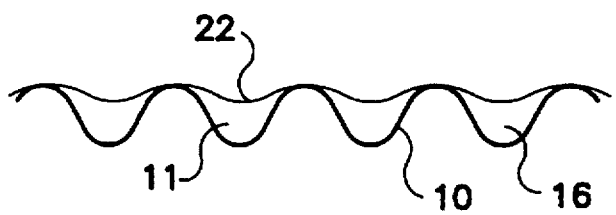
FIG. 2 is a partial cross-sectional view of the stretched metal bellows with the corresponding enlarged intermediate spaces and the wrap positioned thereon.

While this invention is susceptible of embodiment in many different forms, there is shown in the drawings and will herein be described in detail, a specific embodiment with the understanding that the present disclosure can be considered as an exemplification of the principles of the invention and is not intended to limit the invention to the embodiment illustrated.

The present invention comprises a flexible supply line having a helical winding/wrap that is composed of a three layer corrosion protection covering/wrap 22. The wrap interjects itself into the intermediate spaces, such as spaces 16, between corrugations 11 of corrugated pipe/bellows 10. Bellows 10 includes connection members 12, 14 attached at either end thereof and guide pipes 15, 17, which may be received in the respective connection elements 12, 14, to prevent inadvertent buckling of the bellows. The connection members are of sufficient length so as to prevent damage to the wrap thereon upon welding/fusing the connection members to the outside pipes/pipe networks.

Figure 3:
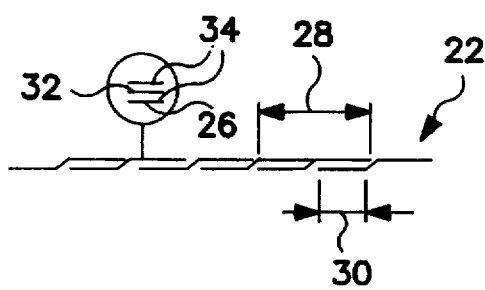
FIG. 3 is a partial cross-sectional view of the overlapped, wound, three layer wrap, with an insert showing, in magnification, the PE carrier layer and the rubber layer.
Figure 4:
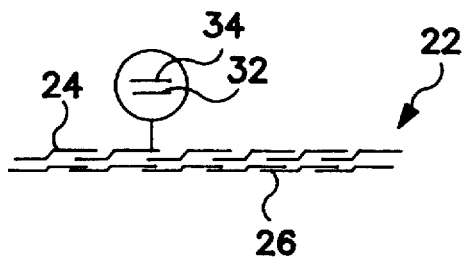
FIG. 4 is a partial cross-sectional view of the wrap showing the two layer construction.

The three layer wrap 22 comprises a PE carrier layer 24 and rubber layer 26. PE carrier layer 24 includes outer PE layer 32 and rubber layer 34. As can be seen in FIGS. 3 and 4, wrap 22 includes width 28 and, when wrapped upon the bellows, the windings overlap distance 30. While other materials are contemplated, the rubber layers and PE layers are of materials which are pliable and capable of fusing regardless of temperature.

The intrinsic stiffness of PE carrier layer 24 in wrap 22 impedes the formation of the complete profile of bellows 10 when protection wrap 22 is wrapped on. A method is employed that permits the band to interject itself partially into intermediate spaces, such as intermediate spaces 16. Narrow wraps lead to the wrap falling into intermediate spaces 16 of bellows 10. Generally, roller type tools do not work satisfactorily, since the surface of the band is very sticky and the band adheres to the roller.

In order to achieve the partial interjection of the wrap, according to the invention, a specified sequence of manufacture is provided. The manufacture comprises the steps of: (1) stretching the bellows; (2) winding the wrap; and (3) compressing the bellows. The step of winding the wrap further includes the step of winding rubber layer 26, then winding PE carrier layer 24. Additionally, the method also includes the step of applying an adhesive to promote the rubber-metal bond between bellows 10 and connections 12, 14 and wrap 22.

Figure 5:
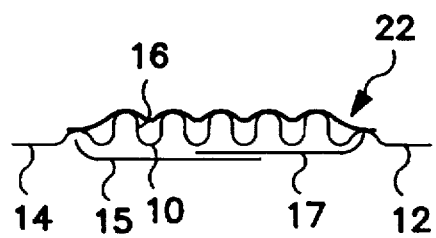
FIG. 5 is a partial cross-sectional view of the metal bellows and the applied wrap.

As a result of the indicated method of manufacture, covering/wrap 22 becomes partially bellows shaped as shown in FIGS. 1 and 5. Any axial extension in bellows 10, and, in turn, the wrap can, thus, be absorbed by the corrugated wrap, similar to the way it is absorbed in the metal bellows. The maximum for axial extension of wrap 22 is considerably greater than that of the uncorrugated material itself, due to the bellows type corrugated profile. The permissible extension of the covering is increased with particular advantage by means of this form, that is, it substantially corresponds to the permissible extension of corrugated pipe/bellows 10.

A complete interjection of the covering into the free spaces (i.e., eliminating intermediate spaces such as intermediate space 16) is not required and not expedient. In underground laying of pipe it is taken into consideration that eventually send and earth fill substantially all voids surrounding the device. As such, a wrap that is completely interjected into the corrugation/intermediate space 16 has the disadvantage that the sand fills in the corrugations, and any movement during axial compression of the compensators is impeded. On the other hand, with only a partially interjected wrap, the volume of the sand proximate the corrugations is considerably smaller due to the larger intermediate space 16, and, as a result the bellows/wrap can move slightly outwardly or inwardly during a compression.

Upon complete extension of the flexible elements, namely the sliding of wrap 22 and the movement of the bellows 10, the wrap construction facilitates the full axial extension of the bellows.

Width 28 of wrap 22, as shown in FIG. 3, should be at least the width of a corrugation of bellows 10 in order to prevent a complete falling into intermediate space 16 of the corrugation.

Overlap width 30 of the wrap 22, as shown in FIG. 3, influences the extendibility of the wrap. If overlap width 30 is small, there will only be a short path for sliding and the winding will readily open up. If overlap 30 is large, the carrier layer of the band will extend greatly and finally tear before any significant sliding occurs.

The width 28 of the wrap 22 and the overlap width 30 should be selected such that with the maximum extension of the flexible elements the wrap seal remains intact; and such that the shear forces in the rubber layer that occur upon extension of the flexible elements are slightly smaller than the force required to tear the carrier layer.

The optimal overlap width 30 (denoted as bk in the equations) can be determined by tests, or can be calculated if the material characteristics are known, as shown below:

τk is the shearing stress upon flow of the rubber layer

δt is the tearing force of the carrier layer, st is the thickness of the carrier layer.

The forces equilibrium in the axial direction is $$\tau k \cdot bk \cdot d = \delta t \cdot st \cdot d$$

resulting in $$bk = \delta t \cdot st / \tau k$$

The overlap width can be derived from this as $$bk < \delta t \cdot st / \tau k$$

It is particularly advantageous to utilize the maximum possible extensibility for each band winding of wrap 22.

Furthermore, as a result of using corrugated pipe or bellows 10 with the applied bellows-like wrap 22 according to the invention, the total extension of the flexible supply line is uniformly divided along the length by means of the overlay of the covering on the corrugation peaks. Accordingly, no small section needs to take up a large extension.

As a particular advantage, the above indicated invention facilitates bellows of virtually any diameter to be wound with wrap 22. The contemplated widths start at approximately DN 50 and end at DN 1600, while it is also contemplated that the wrap would work with pipes that are both larger and smaller. The ease of warehousing the covering material, that is, wrap 22, also results in cost advantages during the manufacturing process and rapid availability of the wrap, and therefore rapid availability for the customer.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A flexible supply line to connect media transporting underground supply lines comprising:

a metal corrugated bellows having two ends and at least two corrugations defining at least one intermediate space, at least one connection member provided at one of the ends of the metal corrugated bellows, and a flexible wrap attached on opposite sides of the at least two corrugations between said two ends respectively, said flexible wrap fabricated, at least, in part, from substantially non-stretchable materials, and wrapped along at least a portion of the length of the at least two corrugations and at least a portion of the at least one connection member, the wrap interjecting at least partially into the at least one intermediate space, when the bellows is in a substantially relaxed configuration to, in turn, assume a corrugated-like form and for enabling substantial axial extension of the flexible supply line substantially without excessive extension of the flexible wrap, when the bellows is in a substantially extended configuration.

2. The flexible supply line according to claim 1 wherein the flexible wrap comprises at least one rubber layer and at least one PE layer.

3. The flexible supply line according to claim 1 wherein the flexible wrap comprises a first rubber layer wrap and at least one carrier wrap having at least two layers, the at least carrier wrap including at least a second rubber layer and at least one PE layer.

4. The flexible supply line according to claim 2 wherein the first rubber layer is helically wrapped about the bellows and successive turns of the first rubber layer are fused to one another to substantially preclude the passage of liquid therethrough, for protecting the bellows against corrosion.

5. The flexible supply line according to claim 1 wherein the flexible wrap is helically wound around the bellows, with successive turns of the wrap overlapping one another, the wrap further being provided with a width which is greater than the length of the at least one intermediate space, when the bellows is in an unextended configuration, the overlapping of the turns of the wrap being operably configured to be maintained when the bellows is in an extended configuration, less than a predetermined length.

6. The flexible supply line according to claim 1 wherein the metal bellows is axially extendable and compressible.

7. The flexible supply line according to claim 1 wherein the metal bellows includes at least one inner guide pipe to prevent inadvertent buckling of the metal bellows.

8. The flexible supply line according to claim 7 wherein the at least one inner guide pipe is received within the at least one connection member to facilitate angular movement of the guide pipe with regard to the longitudinal axis of the at least one connection member.

9. The flexible supply line according to claim 1 wherein the at least one connection member is of sufficient length so that the wrap is not damaged by fusion heat upon connecting the flexible supply line with an outside pipe.

10. The flexible supply line according to claim 1, wherein the flexible wrap further includes a stretchable material.

* * * * *

UNITED STATES PATENT AND TRADEMARK OFFICE
CERTIFICATE OF CORRECTION

PATENT NO. : 5,893,681
DATED : April 13, 1999
INVENTOR(S) : Boden, et. al.

It is certified that error appears in the above-identified patent and that said Letters Patent is hereby corrected as shown below:

Column 4, Line 11   Delete "send" and insert instead --sand--

Signed and Sealed this

First Day of May, 2001

Attest:

NICHOLAS P. GODICI

Attesting Officer   Acting Director of the United States Patent and Trademark Office